United States Patent
Jang et al.

(10) Patent No.: US 11,444,529 B2
(45) Date of Patent: Sep. 13, 2022

(54) ELECTRONIC APPARATUS AND POWER SUPPLY

(71) Applicant: SAMSUNG ELECTRONICS CO., LTD., Suwon-si (KR)

(72) Inventors: Duhee Jang, Suwon-si (KR); Kangmoon Seo, Suwon-si (KR); Wonmyung Woo, Suwon-si (KR); Sanghoon Lee, Suwon-si (KR); Jungho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/126,290

(22) Filed: Dec. 18, 2020

(65) Prior Publication Data

US 2021/0194352 A1     Jun. 24, 2021

(30) Foreign Application Priority Data

Dec. 18, 2019   (KR) .................. 10-2019-0170092

(51) Int. Cl.
*H02M 1/32*   (2007.01)
*H02M 1/44*   (2007.01)
*H02M 7/217*  (2006.01)

(52) U.S. Cl.
CPC ............... *H02M 1/32* (2013.01); *H02M 1/44* (2013.01); *H02M 7/217* (2013.01)

(58) Field of Classification Search
CPC ........... H02M 1/32; H02M 1/44; H02M 7/217
See application file for complete search history.

(56) References Cited

U.S. PATENT DOCUMENTS

| | | | |
|---|---|---|---|
| 2009/0257259 A1 | 10/2009 | Leibovitz | |
| 2012/0212982 A1 | 8/2012 | Wei et al. | |
| 2014/0268956 A1* | 9/2014 | Teren | H02M 7/219 363/89 |
| 2017/0302160 A1* | 10/2017 | Marcinkiewicz | H02M 7/06 |

FOREIGN PATENT DOCUMENTS

| | | |
|---|---|---|
| JP | 7-308069 A | 11/1995 |
| JP | 2010-041863 A | 2/2010 |
| JP | 2013-198267 A | 9/2013 |
| JP | 2014-161195 A | 9/2014 |

OTHER PUBLICATIONS

Communication dated Mar. 31, 2021, issued by the International Searching Authority in counterpart International Application No. PCT/KR2020/017883 (PCT/ISA/210).

* cited by examiner

*Primary Examiner* — Rafael O De Leon Domenech
(74) *Attorney, Agent, or Firm* — Sughrue Mion, PLLC

(57) ABSTRACT

A power supply capable of protecting a rectifier circuit using a switching element from an overvoltage or an overcurrent is provided. The power supply includes a power input terminal; an output capacitor; a synchronous rectifier configured to rectify an AC voltage input through the power input terminal; a converter configured to convert the rectified AC voltage into a DC voltage following a preset voltage and supply the DC voltage to the output capacitor; and a protection circuit provided between the power input terminal and the output capacitor, and configured to supply an AC voltage higher than the voltage charged in the output capacitor to the output capacitor by bypassing the synchronous rectifier.

16 Claims, 7 Drawing Sheets

ELECTRONIC APPARATUS AND POWER SUPPLY

CROSS-REFERENCE TO RELATED APPLICATION(S)

This application is based on and claims priority under 35 U.S.C. § 119 to Korean Patent Application No. 10-2019-0170092, filed on Dec. 18, 2019, in the Korean Intellectual Property Office, the disclosure of which is incorporated by reference herein in its entirety.

BACKGROUND

1. Field

The disclosure relates to a power supply for supplying power and an electronic apparatus including the same.

2. Description of Related Art

In general, a power supply may use a diode bridge as a rectifier circuit. In recent years, research on the rectifier circuit using a switching element to improve conduction loss due to a diode is also being conducted.

However, in the case of configuring the rectifying circuit using the switching element, the switching element may be exposed to voltage stress or current stress by a pulse noise included in the supplied AC voltage.

SUMMARY

Embodiments provide a power supply capable of protecting a rectifier circuit using a switching element from an overvoltage or an overcurrent.

Additional aspects will be set forth in part in the description which follows and, in part, will be apparent from the description, or may be learned by practice of the presented embodiments of the disclosure.

According to an aspect of the disclosure, there is provided a power supply including: a power input terminal; an output capacitor; a synchronous rectifier configured to rectify an AC voltage input through the power input terminal; a converter configured to convert the rectified AC voltage into a DC voltage following a preset voltage and supply the DC voltage to the output capacitor; and a protection circuit provided between the power input terminal and the output capacitor, and configured to supply an AC voltage higher than the voltage charged in the output capacitor to the output capacitor by bypassing the synchronous rectifier.

The protection circuit may be a diode bridge in which a pair of diodes connected in series with each other and another pair of diodes connected in series with each other are connected in parallel.

The protection circuit may be configured to bypass the synchronous rectifier and supply the AC voltage to the output capacitor until a peak voltage of the input AC voltage is the same as the voltage charged in the output capacitor.

The synchronous rectifier may include a plurality of switching elements. The power supply may further include a controller configured to control the plurality of switching elements so that the synchronous rectifier rectifies the AC voltage.

The plurality of switching elements may include a pair of switching elements connected in series with each other and another pair of switching elements connected in series with each other. The pair of switching elements may include a first switching element located at an upper end and a second switching element located at a lower end. The other pair of switching elements may be configured to be connected in parallel with the pair of switching elements and include a third switching element located at the upper end and a fourth switching element located at the lower end.

The synchronous rectifier may be configured to be connected to the power input terminal through a connection point between the first switching element and the second switching element and a connection point between the third switching element and the fourth switching element.

The controller may be configured to control the first switching element and the fourth switching element to be turned on and off in the same phase based on a frequency of the AC voltage, and to control the second switching element and the third switching element to be turned on and off in a phase opposite to the same phase.

The converter may include at least one switching element. The controller may be configured to control the at least one switching element to convert the rectified AC voltage into the DC voltage.

The DC voltage may be configured to exceed a peak value of the rectified AC voltage.

According to an aspect of the disclosure, there is provided a power supply including: a power input terminal; an output capacitor; a synchronous rectifier connected to the power input terminal, and configured to rectify an AC voltage input through the power input terminal; a converter configured to convert the rectified AC voltage into a DC voltage following a preset voltage and supply the DC voltage to the output capacitor; and a diode bridge including an input terminal connected to the power input terminal and an output terminal connected to the output capacitor.

The diode bridge may be configured to bypass the synchronous rectifier and supply the AC voltage to the output capacitor until a peak voltage of the input AC voltage is the same as the voltage charged in the output capacitor.

The diode bridge may be configured to bypass the synchronous rectifier and supply an AC voltage higher than the voltage charged in the output capacitor to the output capacitor.

The synchronous rectifier may include a pair of switching elements connected in series with each other and another pair of switching elements connected in series with each other. The pair of switching elements may include a first switching element located at an upper end and a second switching element located at a lower end. The other pair of switching elements may be configured to be connected in parallel with the pair of switching elements and include a third switching element located at the upper end and a fourth switching element located at the lower end.

The synchronous rectifier may be configured to be connected to the power input terminal through a connection point between the first switching element and the second switching element and a connection point between the third switching element and the fourth switching element.

The converter may include an inductor provided in a line connected to the synchronous rectifier; a fifth switching element provided between an inductor-side node and a ground-side node; and a diode provided in a line connecting the fifth switching element and the output capacitor.

The power supply may further include an electromagnetic interference (EMI) filter provided between the power input terminal and the synchronous rectifier, and configured to block high frequency noise included in the AC voltage.

According to an aspect of the disclosure, there is provided an electronic apparatus including: a load configured to receive power and perform an operation; and a power supply configured to supply power to the load. The power supply may further include a power input terminal; an output capacitor; a synchronous rectifier configured to rectify an AC voltage input through the power input terminal; a converter configured to convert the rectified AC voltage into a DC voltage following a preset voltage and supply the DC voltage to the output capacitor; and a protection circuit provided between the power input terminal and the output capacitor, and configured to supply an AC voltage higher than the voltage charged in the output capacitor to the output capacitor by bypassing the synchronous rectifier.

BRIEF DESCRIPTION OF THE DRAWINGS

The above and/or other aspects, features, and advantages of certain embodiments of the present disclosure will be more apparent from the following description, taken in conjunction with the accompanying drawings, in which.

DETAILED DESCRIPTION

Figure 1:
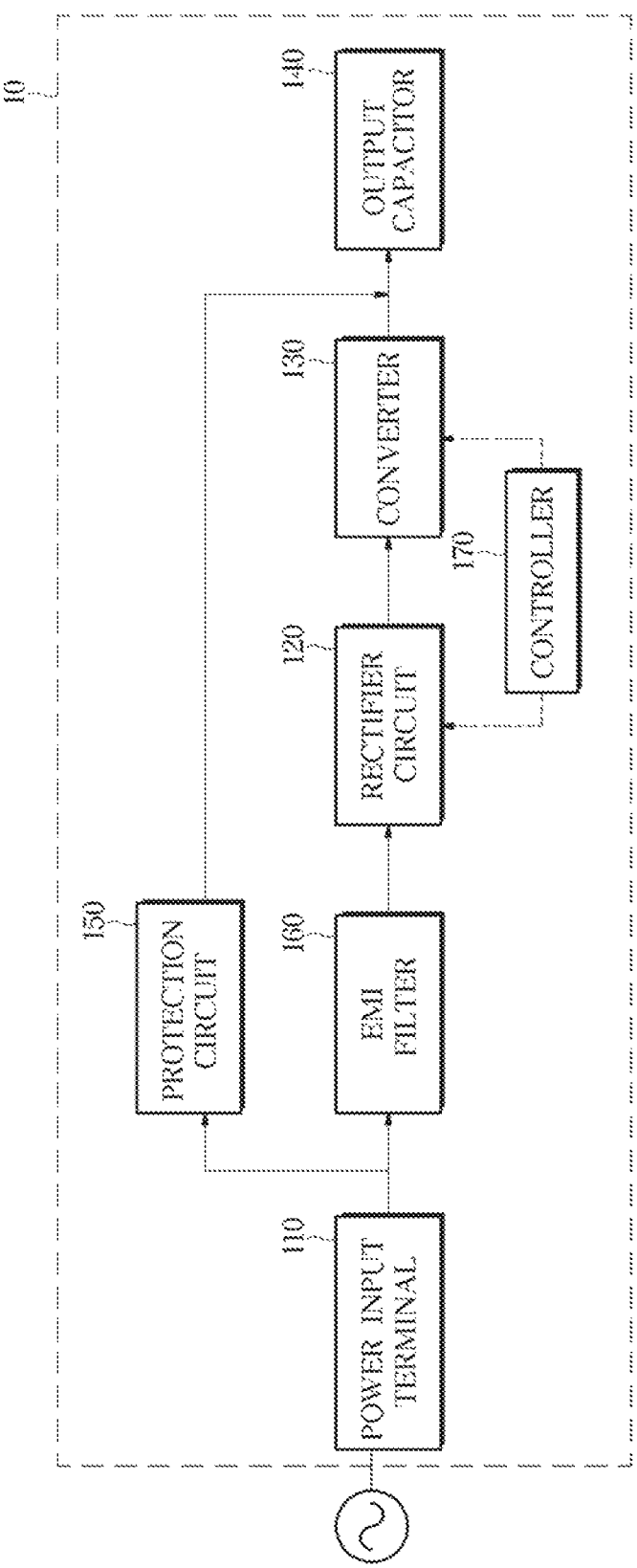
FIG. 1 is a block diagram of a power supply according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

As used herein, the terms "portion," "unit," "block," "member," and "module" refer to a unit that can perform at least one function or operation. The terms may refer to an electrical circuit, and may refer to at least one process which is performed by at least one piece of hardware such as a field-programmable gate array (FPGA) and an application specific integrated circuit (ASIC), and at least one piece of software stored in a memory or a processor.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 2:
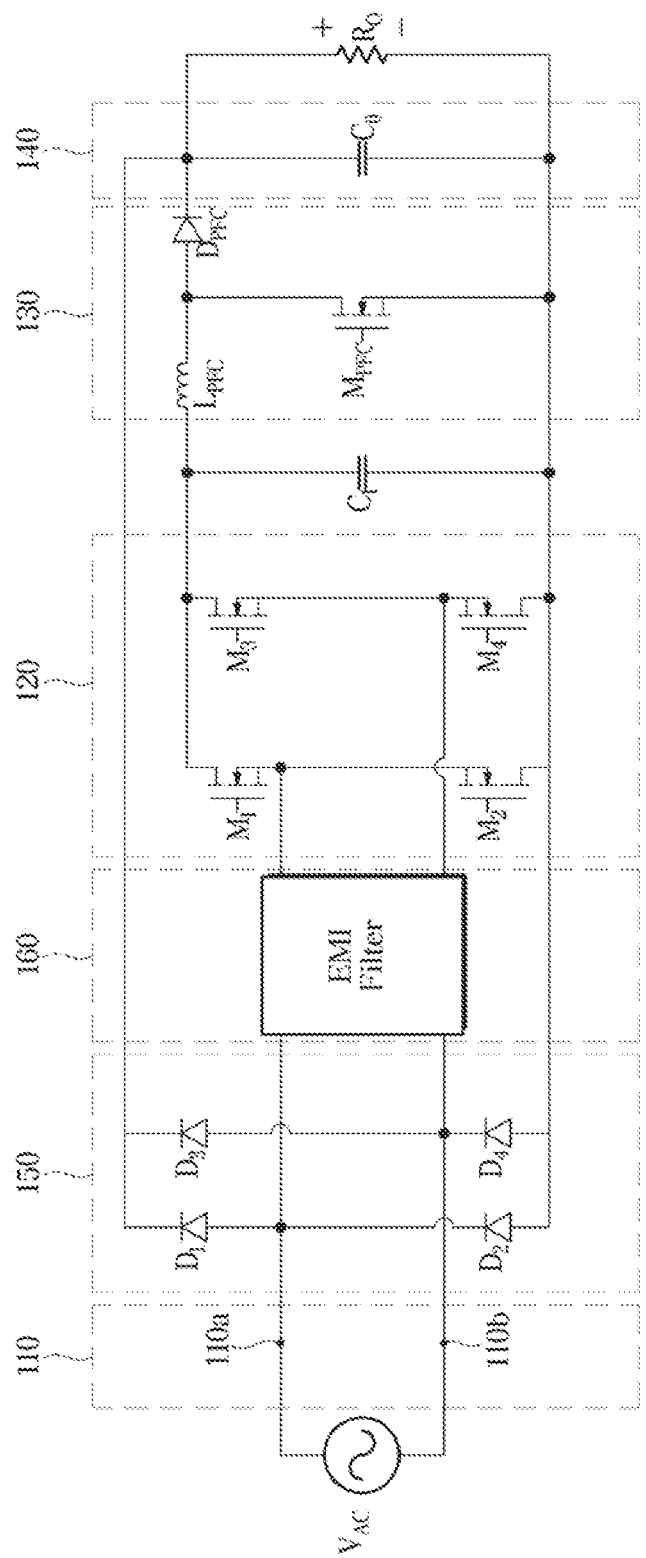
FIG. 2 is a circuit diagram of a power supply according to an embodiment.

FIG. 1 is a block diagram of a power supply according to an embodiment, and FIG. 2 is a circuit diagram of a power supply according to an embodiment.

Referring to FIG. 1, the power supply 10 may include a power input terminal 110 connected to an external power source, a rectifier circuit 120 for rectifying an AC voltage supplied from the external power source, and a converter 130 for converting the rectified AC voltage into a DC voltage following a preset voltage, an output capacitor 140 for receiving the DC voltage output from the converter 130, and a controller 170 for controlling a rectifier circuit 120 and a switching element included in the converter 130.

In addition, the power supply 10 is provided between the power input terminal 110 and the output capacitor 140, and may include a protection circuit 150 for supplying an AC voltage higher than a voltage of the output capacitor 140 to the output capacitor 140 by bypassing the rectifier circuit 120.

In addition, the power supply 10 may further include an electromagnetic interference (EMI) filter that blocks high frequency noise included in the AC voltage, according to the embodiment.

The power input terminal 110 may be connected to the external power source and may receive an AC power from the external power source. To this end, the power input terminal 110 may be connected to the external power source through a first connection point 110a and a second connection point 110b, as illustrated in FIG. 2.

The AC power applied through the power input terminal 110 may be supplied to the rectifier circuit 120 or the protection circuit 150 depending on a magnitude. The description of a supply path of the applied AC power will be described in detail later.

The rectifier circuit 120 may receive the AC power from the power input terminal 110 and rectify the supplied AC power. In other words, the rectifier circuit 120 is connected to the power input terminal 110 and may rectify an AC voltage input through the power input terminal 110.

To this end, the rectifier circuit 120 may include a plurality of switching elements M1, M2, M3, and M4, as illustrated in FIG. 2. That is, the rectifier circuit 120 may rectify the AC voltage by using a plurality of switching elements M1, M2, M3, and M4 instead of a diode bridge.

Particularly, the rectifier circuit 120 includes a pair of switching elements M1 and M2 connected in series with each other and another pair of switching elements M3 and M4 connected in series with each other, as illustrated in FIG. 2.

The pair of switching elements M1 and M2 of the rectifier circuit 120 may include a first switching element M1 located at an upper end and a second switching element M2 located at a lower end with respect to the ground. In addition, another pair of switching elements M3 and M4 is connected in parallel with the pair of switching elements M1 and M2, and may include a third switching element M3 located at the upper end and a fourth switching element M4 located at the lower end with respect to the ground.

That is, the rectifier circuit 120 may include four switching elements M1, M2, M3, and M4 in the form of a full bridge, and may rectify the AC power by turning on or off the four switching elements M1, M2, M3, and M4 under the control of the controller 170.

In this way, the rectifier circuit 120 may include the four switching elements M1, M2, M3, and M4 in the form of the full bridge, and may correspond to a synchronous rectifier that rectifies the AC voltage through synchronization between the switching elements.

In addition, the rectifier circuit 120 may be connected to the power input terminal 110 through a connection point between the first switching element M1 and the second switching element M2 and a connection point between the third switching element M3 and the fourth switching element M4.

At this time, the plurality of switching elements M1, M2, M3, and M4 may include a bipolar junction transistor (BJT), a metal-oxide-semiconductor field effect transistor (MOSFET), an insulating gate bipolar transistor (IGBT), a thyristor, or the like. However, the type of the switching element is not limited to the above example, and any element that performs a switching operation may be included without limitation. Hereinafter, it will be described as an example that the switching elements M1, M2, M3, and M4 correspond to metal oxide semiconductor field effect transistors.

As described above, the power supply 10 may improve the conduction loss in the diode by using the switching elements M1, M2, M3, and M4 instead of the diode, thereby increasing the efficiency of power supply.

However, when pulse noise is applied to the AC voltage supplied from the external power source, a high voltage may be applied to the switching elements M1, M2, M3, and M4, thereby increasing the voltage stress of the switching elements M1, M2, M3, M4. In addition, when the output capacitor 140 is initially charged, a high inrush current may pass through the switching elements M1, M2, M3, M4, so that the current stress of the switching elements M1, M2, M3, and M4 may increase.

In order to improve the voltage stress and current stress of the switching elements M1, M2, M3, and M4 of the rectifier circuit 120, the power supply 10 may provide the protection circuit 150 between the power input terminal 110 and the output capacitor 140. This will be described in detail later.

At this time, the rectifier circuit 120 may rectify only the AC voltage lower than the voltage of the output capacitor 140 as the protection circuit 150 is present. That is, the rectifier circuit 120 may rectify only the AC voltage lower than the voltage charged in the output capacitor 140.

The converter 130 is connected to the rectifier circuit 120 to receive the rectified AC voltage, and convert the rectified AC voltage into the DC voltage following the preset voltage.

In this case, a first capacitor C1 for smoothing the rectified AC voltage may be provided between the rectifier circuit 120 and the converter 130.

The converter 130 may include at least one switching element, and may convert the rectified AC voltage is converted into the DC voltage following the preset voltage by turning on or off at least one switching element under the control of the controller 170.

That is, the converter 130 may boost a magnitude of the rectified AC voltage according to an operation of the at least one switching element to the preset voltage, and synchronize phases of the voltage and the current to improve a power factor. In other words, the converter 130 may correspond to a power factor correction (PFC) boost converter, and the DC voltage may exceed a peak value of the rectified AC voltage.

For example, the converter 130 may include an inductor $L_{PFC}$ provided in a line connected to the rectifier circuit 120, a fifth switching element $M_{PFC}$ provided between a node at the inductor $L_{PFC}$ and a node at the ground, a diode device $D_{PFC}$ provided in a line connecting the switching element $M_{PFC}$ and the output capacitor 140. However, a circuit configuration of the converter 130 is not limited thereto, and there is no limitation as long as it is a circuit configuration of a known converter for improving power factor and boosting.

The output capacitors ($C_o$) 140 may be connected to the converter 130 to receive the DC voltage following the preset voltage. Through this, the output capacitor 140 may supply the DC voltage to the connected load $R_o$.

However, when the output capacitor 140 is initially charged, it may be charged based on the AC power supplied through the protection circuit 150, and may be charged until it is charged with an amount of charge corresponding to the peak value of the AC power. The initial charging of the output capacitor 140 will be described in detail later.

The protection circuit 150 is provided between the power input terminal 110 and the output capacitor 140, and may supply the AC power to the output capacitor 140 by bypassing the rectifier circuit 120 according to the magnitude of the AC voltage applied from the external power source.

To this end, the protection circuit 150 may include an input terminal connected to the power input terminal 110 and an output terminal connected to the output capacitor 140, as illustrated in FIG. 2.

The protection circuit 150 may be the diode bridge including four diodes D1, D2, D3, and D4, as illustrated in FIG. 2. Through this, the protection circuit 150 may supply the AC voltage higher than the voltage of the output capacitor 140 to the output capacitor 140 by bypassing the rectifier circuit 120. That is, the protection circuit 150 may include four diodes D1, D2, D3, and D4 in the form of a full bridge, and may supply the AC voltage higher than the voltage charged in the output capacitor 140 to the output capacitor 140 by bypassing the rectifier circuit 120.

Particularly, the protection circuit 150 may include a pair of diodes D1 and D2 connected in series with each other and another pair of diodes D3 and D4 connected in series with each other, as illustrated in FIG. 2. The pair of diodes D1 and D2 of the protection circuit 150 may include a first diode D1 located at the upper end and a second diode D2 located at the lower end with respect to the ground. In addition, another pair of diodes D3 and D4 is connected in parallel with the pair of diodes D1 and D2, and may include a third diode De located at the upper end and a fourth diode D4 located at the lower end with respect to the ground.

The protection circuit 150 may be connected to the power input terminal 110 through a connection point between the first diode D1 and the second diode D2 and a connection point between the third diode D3 and the fourth diode D4.

For example, when the output capacitor 140 is initially charged and the AC voltage applied from the external power source is larger than the voltage of the output capacitor 140, the protection circuit 150 may supply the AC voltage to the output capacitor 140 by bypassing the rectifier circuit 120.

That is, when the supply of the AC voltage is started, the protection circuit 150 may bypass the rectifier circuit 120 and supply the AC voltage to the output capacitor 140 until the output capacitor 140 is charged with a charge amount corresponding to the peak voltage of the AC voltage. In other words, after the supply of the AC voltage is started, the protection circuit 150 may bypass the rectifier circuit 120 and supply the AC voltage to the output capacitor 140 until the voltage of the output capacitor 140 corresponds to the peak voltage of the AC voltage. In this way, the protection circuit 150 may bypass the rectifier circuit 120 and supply the AC voltage input to the output capacitor 140 until the peak voltage of the input AC voltage is the same as the voltage charged in the output capacitor 140.

In addition, even when the output capacitor 140 has a DC voltage higher than the peak value of the AC voltage as a voltage after the output capacitor 140 is charged, when the AC voltage has the pulse noise and the magnitude of the AC voltage instantaneously becomes higher than the voltage of the output capacitor 140, the protection circuit 150 may supply the pulse noise of the AC voltage to the output capacitor 140 by bypassing the rectifier circuit 120.

In other words, the protection circuit 150 may bypass the rectifier circuit 120 and supply the AC voltage higher than the voltage charged in the output capacitor 140 to the output capacitor 140.

At this time, when the voltage of the output capacitor 140 is greater than the AC voltage, the AC voltage does not pass through the protection circuit 150 and may be rectified through the rectifier circuit 120 and then supplied to the output capacitor 140 through the converter 130. That is, the AC voltage lower than the voltage of the output capacitor 140 may be applied to the rectifier circuit 120 and rectified.

In other words, the rectifier circuit 120 may rectify the AC voltage lower than the voltage charged in the output capacitor 140.

The EMI filter 160 is provided between the power input terminal 110 and the rectifier circuit 120 to block high-frequency noise included in the AC voltage. The EMI filter 160 may be used without limitation as long as it is a known type.

In addition, the EMI filter 160 is illustrated to be provided at the rear end of the protection circuit 150 based on the power input terminal 110, but the position of the EMI filter 160 is not limited thereto, and may be provided at the front end of the protection circuit 150 based on the power input terminal 110.

The controller 170 may control the plurality of switching elements M1, M2, M3, and M4 of the rectifier circuit 120 and the at least one switching element (e.g., $M_{PFC}$) provided in the converter 130.

Particularly, the controller 170 may control the plurality of switching elements M1, M2, M3, and M4 based on the frequency of the AC voltage so that the rectifier circuit 120 rectifies the AC voltage.

For example, the controller 170 may control the first switching element M1 and the fourth switching element M4 to be turned on and off in the same phase based on the frequency of the AC voltage, and may control the second switching element M2 and the third switching element M3 to be turned on and off in a phase opposite to the same phase.

In other words, when the AC voltage corresponds to a positive voltage, the controller 170 may control the first switching element M1 and the fourth switching element M4 to be turned on. When the AC voltage corresponds to a negative voltage, the controller 170 may control the second switching element M2 and the third switching element M3 to be turned on, so that the rectifier circuit 120 may rectify the AC voltage. In this case, the controller 170 may determine whether the AC voltage corresponds to the positive voltage or the negative voltage based on the AC voltage measured by a voltage sensor.

In addition, according to the embodiment, the controller 170 may control the switching of the plurality of switching elements M1, M2, M3, and M4 based on a drain-source voltage $V_{DS}$ of at least one switching element of the plurality of switching elements M1, M2, M3, and M4 measured by the voltage sensor.

In addition, the controller 170 may control the at least one switching element (e.g., $M_{PFC}$) of the converter 130 to convert the rectified AC voltage into the DC voltage.

Particularly, the controller 170 may adjust the switching frequency of the at least one switching element so that the rectified AC voltage based on the preset voltage is converted into the DC voltage following the preset voltage.

The controller 170 may include at least one memory storing a program that performs the operations described above and the operations described later, and at least one processor executing the stored program.

In the above, each configuration of the power supply 10 has been described. Hereinafter, the protection of the switching elements M1, M2, M3, and M4 of the rectifier circuit 120 through the protection circuit 150 will be described in detail.

Figure 3:
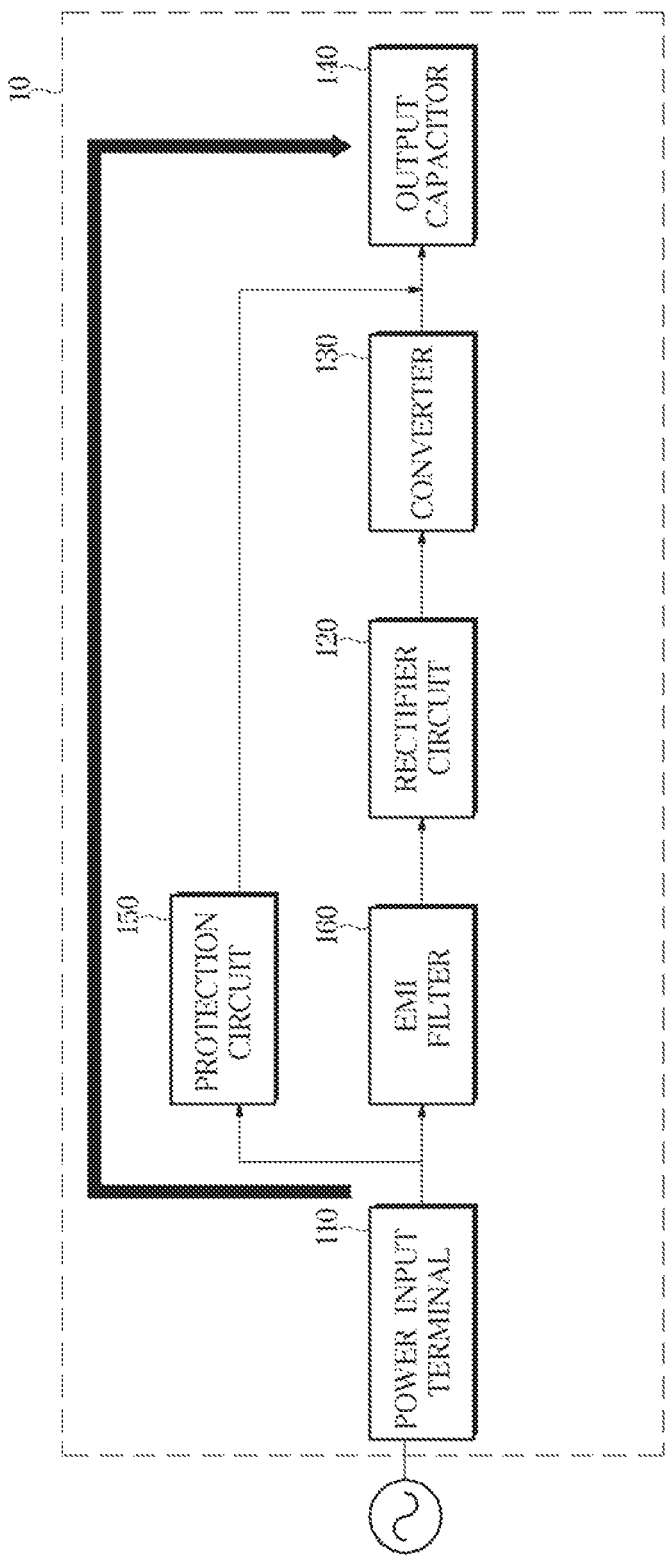
FIG. 3 is a view illustrating a case where a current of a power supply bypasses a rectifier circuit according to an embodiment.
Figure 4:
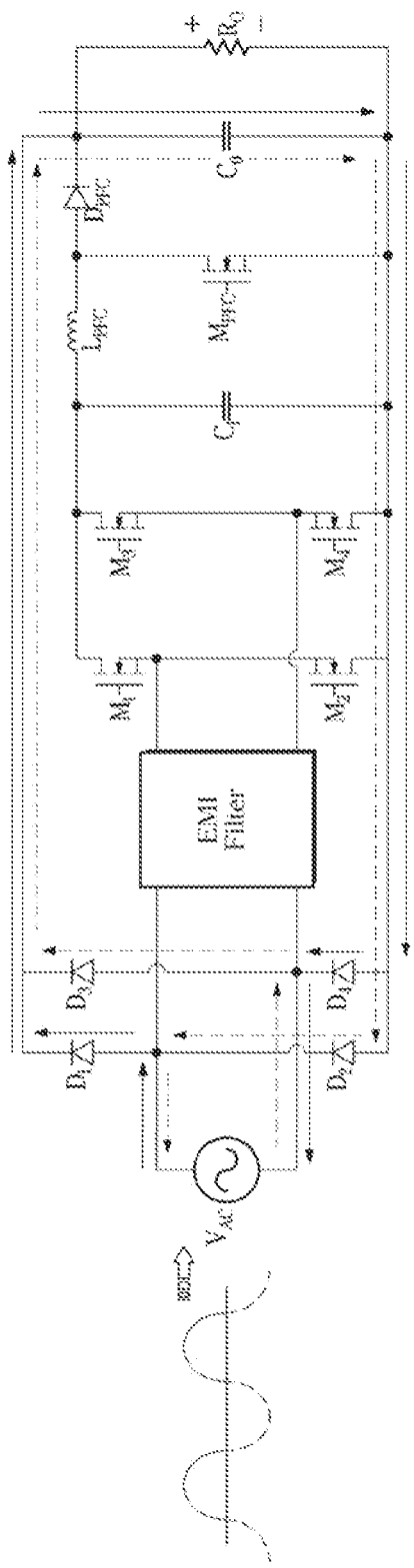
FIG. 4 is a circuit diagram of a case where a current of a power supply bypasses a rectifier circuit according to an embodiment.
Figure 5:
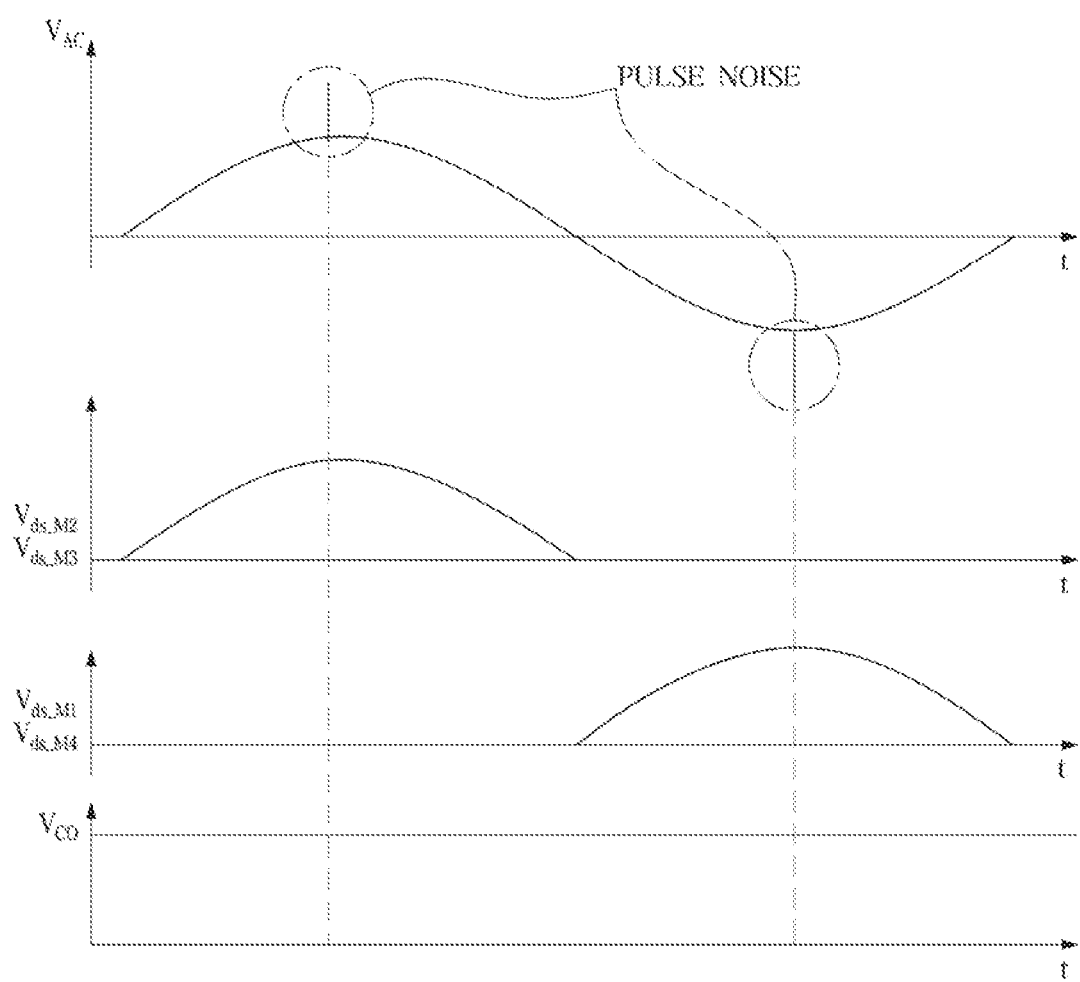
FIG. 5 is a view for describing a case in which a pulse noise is present in an AC voltage supplied to a power supply according to an embodiment.
Figure 6:
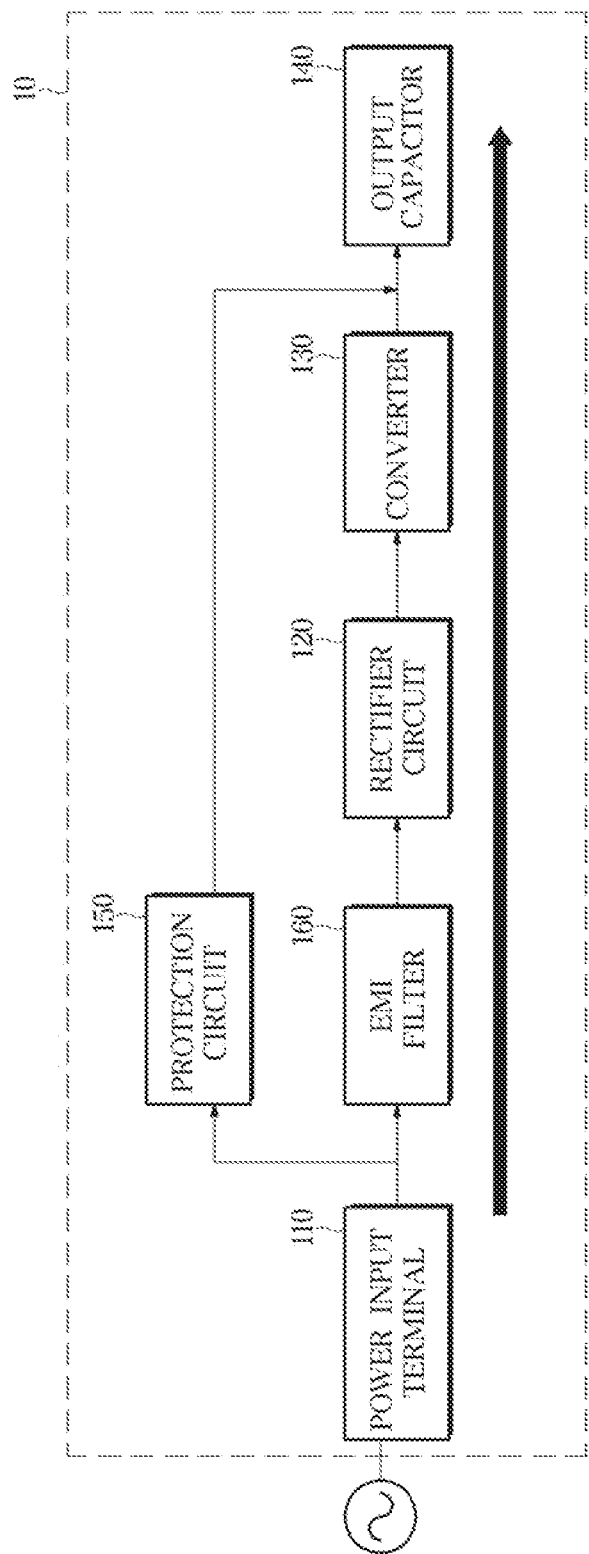
FIG. 6 is a view illustrating a case in which a current of a power supply passes through a rectifier circuit according to an embodiment.

FIG. 3 is a view illustrating a case where a current of a power supply bypasses a rectifier circuit according to an embodiment, FIG. 4 is a circuit diagram of a case where a current of a power supply bypasses a rectifier circuit according to an embodiment, FIG. 5 is a view for describing a case in which a pulse noise is present in an AC voltage supplied to a power supply according to an embodiment, and FIG. 6 is a view illustrating a case in which a current of a power supply passes through a rectifier circuit according to an embodiment.

Referring to FIG. 3, the protection circuit 150 is provided between the power input terminal 110 and the output capacitor 140, and may supply the AC power to the output capacitor 140 by bypassing the rectifier circuit 120 according to the magnitude of the AC voltage applied from the external power source.

To this end, the protection circuit 150 may include the input terminal connected to the power input terminal 110 and the output terminal connected to the output capacitor 140, as illustrated in FIG. 4.

The protection circuit 150 may be the diode bridge including four diodes D1, D2, D3, and D4, as illustrated in FIG. 4. Through this, the protection circuit 150 may supply the AC voltage higher than the voltage of the output capacitor 140 to the output capacitor 140 by bypassing the rectifier circuit 120.

For example, when the output capacitor 140 is initially charged and the AC voltage applied from the external power source is larger than the voltage of the output capacitor 140, the protection circuit 150 may supply the AC voltage to the output capacitor 140 by bypassing the rectifier circuit 120.

That is, when the supply of the AC voltage is started, the protection circuit 150 may bypass the rectifier circuit 120 and supply the AC voltage to the output capacitor 140 until the output capacitor 140 is charged with the charge amount corresponding to the peak voltage of the AC voltage. In other words, after the supply of the AC voltage is started, the protection circuit 150 may bypass the rectifier circuit 120 and supply the AC voltage to the output capacitor 140 until the voltage of the output capacitor 140 corresponds to the peak voltage of the AC voltage. In this way, the protection circuit 150 may bypass the rectifier circuit 120 and supply the AC voltage input to the output capacitor 140 until the peak voltage of the input AC voltage is the same as the voltage charged in the output capacitor 140.

Particularly, as illustrated in FIG. 4, when the supply of the AC voltage is started and the output capacitor 140 is initially charged, the first diode D1 and the fourth diode D4 of the protection circuit 150 are energized by the positive voltage of the AC voltage, so that the inrush current may be supplied to the output capacitor 140 through the first diode D1 and the fourth diode D4 of the protection circuit 150. In addition, the second diode D2 and the third diode D3 of the protection circuit 150 are energized by the negative voltage of the AC voltage, so that the inrush current may be supplied to the output capacitor 140 through the second diode D2 and the third diode D3 of the protection circuit 150.

In this way, when the supply of the AC voltage is started and the output capacitor 140 is initially charged, the inrush current corresponding to the high current value may bypass the rectifier circuit 120 through the protection circuit 150 and be supplied to the output capacitor 140, thereby protecting the rectifier circuit 120 from the inrush current and improving the current stress caused by the inrush current in the switching elements M1, M2, M3, and M4 of the rectifier circuit.

In addition, as illustrated in FIG. 5, the AC voltage including the pulse noise may be applied to the power supply 10. If the protection circuit 150 does not exist, when the pulse noise is applied to the AC voltage supplied from the external power source, the high voltage may be applied to the switching elements M1, M2, M3, and M4, so that the voltage stress of the switching elements M1, M2, M3, and M4 may increase.

To this end, even when the output capacitor 140 has the DC voltage higher than the peak value of the AC voltage as a voltage after the output capacitor 140 is charged, when the AC voltage has the pulse noise and the magnitude of the AC voltage instantaneously becomes higher than the voltage of the output capacitor 140, the protection circuit 150 may supply the pulse noise of the AC voltage to the output capacitor 140 by bypassing the rectifier circuit 120.

That is, when the pulse noise is applied to the power supply 10 and the AC voltage is higher than the voltage of the output capacitor 140, as illustrated in FIG. 4, the first diode D1 and the fourth diode D4 of the protection circuit 150 are energized so that the pulse noise may be supplied to the output capacitor 140 through the first diode D1 and the fourth diode D4 of the protection circuit 150, or the second diode D2 and the third diode D3 of the protection circuit 150 are energized so that the pulse noise may be supplied to the output capacitor 140 through the second diode D2 and the third diode D3 of the protection circuit 150.

Through this, since the pulse noise is applied to the output capacitor 140 charged with a high electric charge and clamped with the preset voltage, the pulse noise may not be applied to the switching elements M1, M2, M3, and M4 of the rectifier circuit 120. Therefore, as illustrated in FIG. 5, the pulse noise may not appear in the drain-source voltages $V_{DS\_M1}$, $V_{DS\_M2}$, $V_{DS\_M3}$, $V_{DS\_M4}$ of each of the switching elements M1, M2, M3, and M4, and the voltage Vco of the output capacitor 140 may follow the preset voltage even if the pulse noise is applied according to the high amount of charge of the output capacitor 140.

In this way, when there is the pulse noise in the AC voltage, the power supply 10 prevents the pulse noise from being applied to the rectifier circuit 120 through the protection circuit 150, thereby improving the voltage stress in the switching elements M1, M2, M3, and M4 of the rectifier circuit 120 due to the pulse noise.

In other words, the protection circuit 150 may bypass the rectifier circuit 120 and supply the AC voltage higher than the voltage charged in the output capacitor 140 to the output capacitor 140.

At this time, when the voltage Vco of the output capacitor 140 is greater than the AC voltage, as illustrated in FIG. 6, the AC voltage does not pass through the protection circuit 150 and may be rectified through the rectifier circuit 120 and then supplied to the output capacitor 140 through the converter 130. That is, the AC voltage lower than the voltage of the output capacitor 140 may be applied to the rectifier circuit 120 and rectified.

As described above, when the applied AC voltage is lower than the voltage Vco of the output capacitor 140, that is, the output voltage, the diodes D1, D2, D3, and D4 of the protection circuit 150 are not energized, operations of the rectifier circuit 120 and the converter 130 are not affected.

In other words, the rectifier circuit 120 may rectify the AC voltage lower than the voltage charged in the output capacitor 140.

As a result, the protection circuit 150 is energized only when the applied AC voltage is higher than the voltage Vco of the output capacitor 140, while preventing the pulse noise from being applied to the rectifier circuit 120 when the output capacitor 140 is initially charged or preventing a pulse noise voltage from being applied to the rectifier circuit 120 when the pulse noise exists in the AC voltage, a rectification operation of the rectifier circuit 120 may not be affected.

Figure 7:
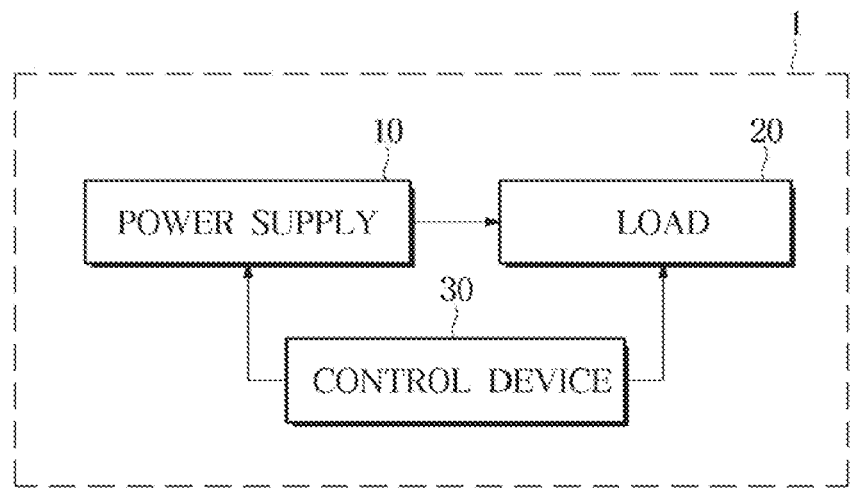
FIG. 7 is a control block diagram of an electronic apparatus according to an embodiment.

FIG. 7 is a control block diagram of an electronic apparatus according to an embodiment.

Referring to FIG. 7, the electronic apparatus 1 may include the power supply 10 for receiving the AC voltage from the external power source and supplying power to a load 20, the load 20 that is driven by receiving power, and a control device 30 for controlling the power supply 10 and the load 20.

The power supply 10 may correspond to the power supply 10 described according to the embodiments of FIGS. 1 to 6.

That is, the power supply 10 may include the protection circuit 150 provided between the power input terminal 110 and the output capacitor 140, and may prevent the inrush current from being applied to the rectifier circuit 120 when the output capacitor 140 is initially charged or the pulse noise voltage from being applied to the rectifier circuit 120 when the pulse noise exists in the AC voltage, and may provide the DC voltage following the preset voltage to the load 20.

The load 20 may be driven based on the output voltage supplied from the power supply 10. For example, the load 20 may correspond to a display, and may display an image under the control of the control device 30. As such, the load 20 is a device that provides an output required to a user based on the output voltage supplied from the power supply 10, and is not limited to the above example, and there is no limitation on the type.

At this time, the load 20 may appear as a resistance that varies depending on the operation, and the control device 30 may control a switching period of the converter 130 so as to adjust the magnitude of the preset voltage followed by the DC voltage according to a resistance value indicated by the load 20 or improve the power factor.

The control device 30 may be implemented as an algorithm for controlling the operation of components in the electronic apparatus 1 or a memory storing data for a program that reproduces the algorithm, and a processor the above-described operation using data stored in the memory. Further, the control device 30 may be implemented as a single chip with the controller 170 of the power supply 10.

According to the power supply and the electronic apparatus including the same according to the embodiments, it is possible to protect the rectifier circuit using a switching element from an overvoltage or an overcurrent, thereby improving the voltage stress and the current stress applied to the rectifier circuit.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A power supply comprising:
    a power input terminal;
    an output capacitor;
    a synchronous rectifier configured to rectify an AC voltage input through the power input terminal;
    a converter configured to convert the rectified AC voltage into a DC voltage based on a preset voltage and supply the DC voltage to the output capacitor;
    a protection circuit provided between the power input terminal and the output capacitor, and configured to supply an AC voltage higher than voltage charged in the output capacitor to the output capacitor by bypassing the synchronous rectifier; and
    an electromagnetic interference filter provided between the power input terminal and the synchronous rectifier, and configured to block high frequency noise included in the AC voltage.

2. The power supply according to claim 1, wherein the protection circuit is a diode bridge in which a pair of diodes connected in series with each other and another pair of diodes connected in series with each other are connected in parallel.

3. The power supply according to claim 1, wherein the protection circuit is further configured to bypass the synchronous rectifier and supply the AC voltage to the output capacitor until a peak voltage of the input AC voltage is the same as the voltage charged in the output capacitor.

4. The power supply according to claim 1, wherein:
    the synchronous rectifier comprises a plurality of switching elements; and
    the power supply further comprises a controller configured to control the plurality of switching elements so that the synchronous rectifier rectifies the AC voltage.

5. The power supply according to claim 4, wherein:
    the plurality of switching elements comprise a pair of switching elements connected in series with each other and another pair of switching elements connected in series with each other;
    the pair of switching elements comprises a first switching element located at an upper end and a second switching element located at a lower end; and
    the another pair of switching elements is configured to be connected in parallel with the pair of switching elements and comprises a third switching element located at the upper end and a fourth switching element located at the lower end.

6. The power supply according to claim 5, wherein the synchronous rectifier is further configured to be connected to the power input terminal through a connection point between the first switching element and the second switching element and a connection point between the third switching element and the fourth switching element.

7. The power supply according to claim 5, wherein the controller is further configured to control the first switching element and the fourth switching element to be turned on and off in a same phase based on a frequency of the AC voltage, and to control the second switching element and the third switching element to be turned on and off in a phase opposite to the same phase.

8. The power supply according to claim 5, wherein:
    the converter comprises at least one switching element; and
    the controller is further configured to control the at least one switching element to convert the rectified AC voltage into the DC voltage to follow the preset voltage.

9. The power supply according to claim 1, wherein the DC voltage is configured to exceed a peak value of the rectified AC voltage.

10. A power supply comprising:
    a power input terminal;
    an output capacitor;
    a synchronous rectifier connected to the power input terminal, and configured to rectify an AC voltage input through the power input terminal;
    a converter configured to convert the rectified AC voltage into a DC voltage based on a preset voltage and supply the DC voltage to the output capacitor;
    a diode bridge including an input terminal connected to the power input terminal and an output terminal connected to the output capacitor; and
    an electromagnetic interference filter provided between the power input terminal and the synchronous rectifier, and configured to block high frequency noise included in the AC voltage.

11. The power supply according to claim 10, wherein the diode bridge is configured to bypass the synchronous rectifier and supply the AC voltage to the output capacitor until a peak voltage of the input AC voltage is the same as voltage charged in the output capacitor.

12. The power supply according to claim 10, wherein the diode bridge is further configured to bypass the synchronous rectifier and supply an AC voltage higher than voltage charged in the output capacitor to the output capacitor.

13. The power supply according to claim 10, wherein:
the synchronous rectifier comprises a pair of switching elements connected in series with each other and another pair of switching elements connected in series with each other;
the pair of switching elements comprises a first switching element located at an upper end and a second switching element located at a lower end; and
the another pair of switching elements is configured to be connected in parallel with the pair of switching elements and comprises a third switching element located at the upper end and a fourth switching element located at the lower end.

14. The power supply according to claim 13, wherein the synchronous rectifier is further configured to be connected to the power input terminal through a connection point between the first switching element and the second switching element and a connection point between the third switching element and the fourth switching element.

15. The power supply according to claim 10, wherein the converter comprises:
an inductor provided in a line connected to the synchronous rectifier;
a fifth switching element provided between an inductor-side node and a ground-side node; and
a diode provided in a line connecting the fifth switching element and the output capacitor.

16. An electronic apparatus comprising:
a load configured to receive power and perform an operation; and
a power supply configured to supply power to the load, and comprising:
a power input terminal,
an output capacitor,
a synchronous rectifier configured to rectify an AC voltage input through the power input terminal,
a converter configured to convert the rectified AC voltage into a DC voltage based on a preset voltage and supply the DC voltage to the output capacitor,
a protection circuit provided between the power input terminal and the output capacitor, and configured to supply an AC voltage higher than voltage charged in the output capacitor to the output capacitor by bypassing the synchronous rectifier, and
an electromagnetic interference filter provided between the power input terminal and the synchronous rectifier, and configured to block high frequency noise included in the AC voltage.

* * * * *